United States Patent [19]

Gregory et al.

[11] Patent Number: 5,281,263

[45] Date of Patent: Jan. 25, 1994

[54] AZO DYES CONTAINING A CARBOXY GROUP

[75] Inventors: Peter Gregory, Bolton; Prahalad M. Mistry, Ashton-Under-Lyne, both of England

[73] Assignee: Imperial Chemical Industries PLC, London, England

[21] Appl. No.: 822,909

[22] Filed: Jan. 21, 1992

[30] Foreign Application Priority Data

Jan. 24, 1991 [GB] United Kingdom ............... 9101544

[51] Int. Cl.$^5$ ................... C09D 11/02; C07C 245/10
[52] U.S. Cl. .................... 106/22 K; 534/671;
534/823; 534/829; 534/830; 534/833; 534/836
[58] Field of Search ............ 106/22 K; 534/671, 823, 534/829, 830, 833, 836

[56] References Cited

U.S. PATENT DOCUMENTS

| 4,083,844 | 4/1978 | Gottschlich et al. | 534/829 |
| 4,173,565 | 11/1979 | Stingl | 534/829 |
| 4,557,761 | 12/1985 | Kobayashi et al. | 106/22 K |
| 4,626,284 | 12/1986 | Ohta et al. | 106/22 K |
| 4,724,001 | 2/1988 | Ohta et al. | 106/22 K |
| 4,752,337 | 6/1988 | Kunde | 106/22 K |
| 4,963,189 | 10/1990 | Hindagolla | 106/22 K |
| 5,053,495 | 10/1991 | Greenwood et al. | 106/22 K |
| 5,062,893 | 11/1991 | Adamic et al. | 106/22 K |

FOREIGN PATENT DOCUMENTS

| 3436891 | 4/1985 | Fed. Rep. of Germany . |
| 3616128 | 11/1986 | Fed. Rep. of Germany . |
| 2537150 | 6/1984 | France . |
| 81249 | 5/1985 | Japan ................... 534/836 |
| 108470 | 6/1985 | Japan ................... 534/836 |
| 2759 | 1/1986 | Japan ................... 534/833 |
| 2775 | 1/1986 | Japan ................... 534/833 |

OTHER PUBLICATIONS

Chemical Abstracts, vol. 103, No. 18, Nov. 1985, Columbus, Ohio, US; abstract No. 143353Y, "disazo compounds for ink-jet printing", p. 70.

Primary Examiner—Helene Klemanski
Attorney, Agent, or Firm—Cushman, Darby & Cushman

[57] ABSTRACT

According to the present invention there is provided a compound which, in the free acid form, is of the Formula (1):

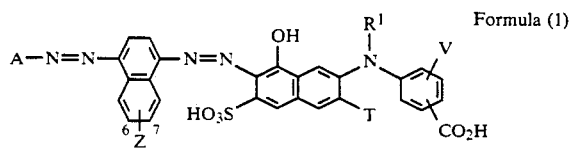

wherein
A is an optionally substituted phenyl or naphthyl group;
Z is H, $CO_2H$, $SO_3H$ or $SO_2NH_2$;
T is H or $SO_3H$;
$R^1$ is H or optionally substituted alkyl;
V is H, $CO_2H$, $SO_3H$, $CH_3$ or Cl; provided that the compound of Formula (1) has at least as many $CO_2H$ groups as $SO_3H$ groups.

The compound is useful as a colorant for inks used in ink jet printing.

14 Claims, No Drawings

AZO DYES CONTAINING A CARBOXY GROUP

This invention relates to a bisazo compound and inks produced therefrom, to a process for the coloration of a substrate using such inks, and in particular to black anionic dyes.

According to a first aspect of the present invention there is provided a compound which, in the free acid form, is of the Formula (1):

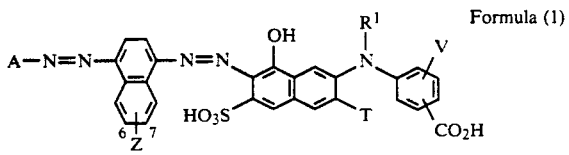

wherein
A is an optionally substituted phenyl or naphthyl group;
Z is H, $CO_2H$, $SO_3H$ or $SO_2NH_2$;
T is H or $SO_3H$;
$R^1$ is H or optionally substituted alkyl;
V is H, $CO_2H$, $SO_3H$, $CH_3$ or Cl;
provided that the compound of Formula (1) has at least as many $CO_2H$ groups as $SO_3H$ groups.

The optional substituent or substituents present on A are preferably selected from the group consisting of $-CO_2H$; $-SO_3H$; $-C_{1-4}$-alkyl, especially methyl; $-C_{1-4}$-alkoxy, especially methoxy; halo, especially $-Cl$; $-CN$; $-NO_2$; $-CO_2R^2$; $-SO_2R^2$; $-SO_2NR^2R^3$; $-NHCOCH_3$; $-OH$; and $-CONR^2R^3$; wherein $R^2$ and $R^3$ are each independently selected from H and $C_{1-4}$-alkyl. At least one of the optional substituents present on A is preferably $SO_3H$, or, more preferably, $-CO_2H$. It is preferred that the group represented by A has 1 or 2 said substituents. It is especially preferred that A carries a $-CO_2H$ group and optionally a second group selected from $CO_2H$, $SO_3H$, methyl, methoxy and chloro.

When Z is $CO_2H$, $SO_3H$ or $SO_2NH_2$ it is preferably at the 6- or 7- position indicated in Formula (1). It is preferred that Z is H or $SO_3H$. When Z is $SO_3H$ it is preferably at the 7-position as this surprisingly leads to a dye having a strong neutral black shade of high optical density and low bronzing when printed on paper.

The compounds of Formula (1) preferably have two or more $-CO_2H$ groups, more preferably from two to five $-CO_2H$ groups, and especially two or three $-CO_2H$ groups.

It is preferred that T is H.

It is preferred that $R^1$ is H or methyl, especially H.

Examples of preferred optionally substituted phenyl and naphthyl groups represented by A are 4-carboxyphenyl, 3-carboxyphenyl, 3,5-dicarboxyphenyl, 3,4-dicarboxyphenyl, 2-methyl-5-carboxyphenyl, 2-sulpho-5-carboxyphenyl, 6-carboxynaphth-1-yl, 7-carboxynaphth-1-yl, 6-carboxynaphth-2-yl and 1-sulpho-6-carboxy-naphth-2-yl.

Especially preferred compounds of Formula (1) include those in which A is meta- or para-carboxyphenyl, or 3,4- or 3,5-dicarboxyphenyl; $R^1$ and T are H; Z is H or $SO_3H$; and V is H or $CO_2H$.

In compounds of Formula (1) it is preferred that all $CO_2H$ groups are in positions which are not adjacent to groups with which they can form intramolecular hydrogen bonds, such as $-NH_2$, $-NH-$ and $-OH$ groups. Accordingly a preferred compound according to the invention, in the free acid form, is of the formula:

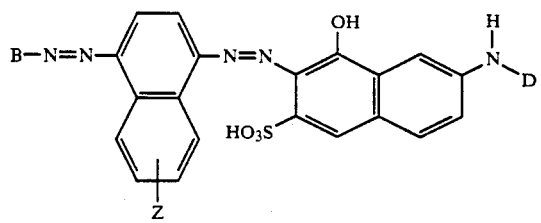

wherein:
Z is H or $SO_3H$; and
B & D are each independently 3-carboxyphenyl, 4-carboxyphenyl, 3,4-dicarboxyphenyl or 3,5-dicarboxyphenyl.

The compounds of Formula (1) may be in the free acid form, as shown, but are preferably in the form of their salts with a cation such as an alkali metal, ammonium or optionally substituted $C_{1-4}$-alkylammonium cation. The preferred $C_{1-4}$-alkylammonium cations consist of a nitrogen atom having four substituents selected from H, $C_{1-4}$-alkyl and hydroxy $C_{1-4}$-alkyl, for example mono-, di-, tri- and tetra-($C_{1-4}$- alkyl)ammonium and mono-, di-, tri- and tetra-(hydroxy-$C_{1-4}$- alkyl)ammonium. It is, however, especially preferred that the cation is ammonium (i.e. $NH_4^+$), methylammonium or dimethylammonium or that the dye of Formula (1) is in the form of a mixed alkali metal (especially sodium) and ammonium salt.

Examples of optionally substituted $C_{1-4}$-alkylammonium cations includes methylammonium, ethylammonium, dimethylammonium, diethylammonium, trimethylammonium, triethylammonium, tri-(2-hydroxyethyl)ammonium and tetramethylammonium.

The present compounds can be prepared by diazotising an amine of formula $A-NH_2$, preferably below 5° C. using a nitrite and mineral acid, coupling with an alpha-naphthylamine compound substituted by Z to give a monoazo compound, diazotising the resultant monoazo compound and coupling with a compound of Formula (2):

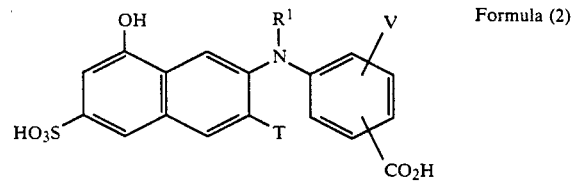

Compounds of Formula (2) may be prepared using the Bucherer reaction in which, for example, 1-hydroxy-3-sulpho-7-hydroxy (or 7-amino)-naphthalene or 1-hydroxy-3,6-disulpho-7-hydroxy (or 7-amino)-naphthalene is reacted with a carboxyaniline derivative substituted by a group represented by V, in the presence of an alkali metal or ammonium sulphite and bisulphite (e.g. sodium sulphite mixed with sodium bisulphite) with heating, particularly in the range 60°–100° C., and especially 70°–90° C. In the presently described process for the manufacture of compounds of Formulae (1) and (2) A, Z, $R^1$, T and V are as hereinbefore defined.

Preferred compounds according to the present invention are those shown in Formulae (3), (4), (5), (6) and (8) in Examples 1, 2, 3, 4 and 6, respectively.

The present invention relates not only to a compound of Formula (1), but also to a composition comprising two or more compounds of Formula (1). An example of such a composition is a mixture containing two compounds of Formula (1) which differ only in the position of the group defined by Z, such as may be formed when the alpha-naphthylamine compound mentioned in the above preparation process is mixed 1,6- and 1,7-Cleves acid. A second example of such a composition is a mixture containing two different compounds of Formula (1) wherein the identities and positions of Z, T and $R^1$ are identical in both compounds but the identities and-/or the positions of A and V are different.

It is preferred that the composition according to the invention contains two compounds of Formula (1) in a weight-to-weight ratio of 99:1 to 1:99, more preferably 90:10 to 10:90, especially 80:20 to 20:80, more especially 60:40 to 40:60.

A particularly preferred composition contains a first compound of Formula (1) wherein A is 4-carboxyphenyl and the group attached to $-NR^1-$ is 3-carboxyphenyl and a second compound of Formula (1) wherein A is 3-carboxyphenyl and the group attached to $-NR^1-$ is 4-carboxyphenyl.

The compounds and compositions of the present invention can be converted into their ammonium or optionally substituted lower alkylammonium salt by dissolving the compound in the form of a salt with an alkali metal, acidifying with a mineral acid, e.g. hydrochloric acid, adjusting the solution to pH 9–9.5 with ammonia or an optionally substituted lower alkylamine and removing alkali metal chloride ions by dialysis.

It will be understood that the present invention covers all tautomeric forms of compounds of Formula (1), for example the tautomeric equivalent of Formula (1) in which the naphthylhydroxy group is in its keto form.

A compound or composition of the present invention, particularly in the form of it's ammonium or optionally substituted lower alkylammonium salt, is a useful colorant for an ink, and exhibits high solubility in water and aqueous media and good water fastness and gives a print with a deep black shade on plain paper. The compound or composition is versatile, exhibiting high water fastness on alkaline, neutral and acid papers.

A suitable ink comprises a compound or a composition according to the present invention and a liquid medium, preferably an aqueous medium. It is preferred that the compound or composition is completely dissolved in the liquid medium to form a solution.

The ink preferably contains from 0.5% to 20%, more preferably from 0.5% to 15%, and especially from 1% to 5%, by weight of the compound or composition, based on the total weight of the ink.

The liquid medium is preferably water or a mixture comprising water and water-soluble organic solvent, preferably in a weight ratio from 99:1 to 1:99, more preferably from 95:1 to 50:50 and especially from 90:10 to 60:40.

The water-soluble organic solvent is preferably a $C_{1-4}$- alkanol such as methanol, ethanol, n-propanol, isopropanol, n-butanol, sec-butanol, tert-butanol or isobutanol; an amide such as dimethylformamide or dimethylacetamide; a ketone or ketone alcohol such as acetone or diacetone alcohol; an ether such as tetrahydrofuran or dioxane; a polyalkylene glycol such as polyethylene glycol or polypropylene glycol; an alkylene glycol or thioglycol containing a $C_2-C_6$ alkylene group such as ethylene glycol, propylene glycol, butylene glycol or triethylene glycol; a thiodiglycol, hexylene glycol, or diethylene glycol; a polyol such as glycerol or 1,2,6-hexanetriol; a lower alkyl ether of a polyhydric alcohol such as 2-methoxyethanol, 2-(2-methoxyethoxy)ethanol, 2-(2-ethoxyethoxy)- ethanol, 2-[2-(2-methoxyethoxy)ethoxy]ethanol, 2-[2-(2-ethoxyethoxy)-ethoxy]-ethanol; 2-pyrrolidone or N-methylpyrrolidone; or a mixture containing two or more of the aforementioned water-soluble organic solvents.

Preferred water-soluble organic solvents are selected from 2-pyrrolidone, N-methylpyrrolidone, an alkylene glycol or lower alkyl ether of a polyhydric alcohol such as ethylene glycol, diethylene glycol, triethylene glycol or 2-methoxy-2-ethoxy-2-ethoxyethanol; and a polyethylene glycol with a molecular weight of up to 500. A preferred specific solvent mixture is a binary mixture of water and either diethylene glycol, 2-pyrrolidone or N-methylpyrrolidone in a weight ratio as mentioned above.

Examples of suitable ink media are given in U.S. Pat. Nos. 4,963,189, 4,703,113, 4,626,284 and EP 4,251,50A.

It is preferred that the inks of the present invention further comprise one or more of a penetrant to assist permeation of the dye into a paper substrate, a kogation-reducing agent to prevent or reduce the build-up of residue (koga) on the resistor surface in thermal ink jet printers and a buffer such as sodium borate, to stabilise the pH of the ink.

The kogation-reducing agent is preferably an oxo anion, such as described in EP 425150A. The oxo-anion may be $C_2O_4^{2-}$, $SO_3^{2-}$, $SO_4^{2-}$, molybdate, $AsO_4^{3-}$ or more preferably a phosphate ester, a diorganophosphate or more especially a phosphate salt which is particularly effective in reducing kogation.

As examples of phosphate salts there may be mentioned dibasic phosphate ($HPO_4^{2-}$) monobasic phosphates ($H_2PO_4^-$) and polyphosphates ($P_2O_7^{4-}$). The selection of counter ion is not believed to be critical and examples include alkali metals, ammonium and alkylammonium cations.

The kogation-reducing agent is preferably present in the ink at a concentration from 0.001% to 15%, based on oxo-anion, and more preferably from 0.01% to 1% (by weight).

A further aspect of the present invention provides a process for printing a substrate with an ink using an ink jet printer, characterised in that the ink contains at least one compound according to the first aspect of the present invention.

A suitable process for the application of an ink as hereinbefore defined comprises forming the ink into small droplets by ejection from a reservoir through a small orifice so that the droplets of ink are directed at a substrate. This process is commonly referred to as ink jet printing, and the ink jet printing processes for the present inks are preferably piezoelectric ink jet printing, and more especially thermal ink jet printing. In thermal ink jet printing, programmed pulses of heat are applied to the ink by means of a resistor, adjacent to the orifice during relative movement between the substrate and the reservoir.

A preferred substrate is an overhead projector slide or a cellulosic substrate, especially plain paper, which may have an acid, alkaline or neutral character.

The preferred ink used in the process is as hereinbefore described.

According to a still further aspect of the present invention there is provided a paper or an overhead projector slide printed with a compound according to the invention.

The invention is further illustrated by the following Examples in which all parts and percentages are by weight unless otherwise indicated.

EXAMPLE 1

Preparation of the Compound of Formula (3)

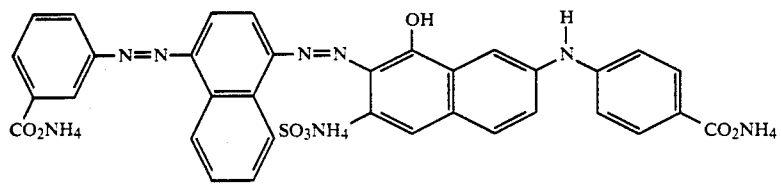

Formula (3)

STAGE 1

3-Aminobenzoic acid (13.7 g, 0.1M) was stirred in water (150 ml) at room temperature and 2N NAOH added to form a solution at pH 8.0. 2N NANO solution (50 ml) was added and the mixture stirred to homogenise. The solution was added gradually to a mixture of ice/water (150 ml) and 35% HCl (50 ml) at 5° C. and the resulting solution stirred for 2 hours at 5° C. Sulphamic acid solution (10%) was added in order to remove excess nitrous acid from the diazo solution.

1-Naphthylamine (14.3 g, 0.1M) was dissolved in water (300 ml) and 36% HCl (15 ml) at 70° C. and cooled to room temperature. The resulting suspension was added to the above diazo solution at 10° C. and the pH adjusted to 4.5 by the addition of sodium acetate. The mixture was stirred for 18 hours and the product collected by filtration and washed with water (100 ml) to give a paste.

STAGE 2

4-Carboxyphenyl Gamma acid was prepared as follows.

2106 parts of sodium bisulphite 40% liquor, 70 parts of water and 429 parts of 100° Tw NAOH solution were heated at 85°±2° C. for 24 hours then cooled to ambient temperature. 2,8-Dihydroxy-6-sulpho naphthalene (413 parts) and 4-aminobenzoic acid (493 parts) were added, the mixture stirred for 15 minutes then the pH adjusted to approximately 6.1 by the addition of NAOH, and stirred for 1½ days. The precipitate was filtered off, washed with brine, and crystallised from water to give 4-carboxyphenyl Gamma acid.

STAGE 3

The paste from Stage 1 (0.1M) was dissolved in water (1 liter) with addition of 2N NAOH solution, pH 10. 2N NaNO$_2$ solution (50 ml) was added and the mixture stirred for 3 minutes, then added gradually to a mixture of ice/water (150 ml) and 36% HCl (50 ml) at 5° C. using rapid agitation. The resulting suspension was stirred for 2 hours at 5° C. Sulphamic acid (10%) was added in order to remove excess nitrous acid from the diazo suspension.

4-Carboxyphenyl Gamma acid (from Stage 2, 35.9 g, 0.1M) was dissolved in water (500 ml) with addition of 2N NAOH solution, pH 9.0. The solution was cooled to 0°–10° C. and added to the above diazo suspension, maintaining the pH at 8.0 with 2N NAOH solution.

The precipitated product was collected by filtration and washed with 5% NaCl solution (100 ml) to give a paste.

STAGE 4

The paste from Stage 3 was stirred in water (500 ml) at pH 8.0 until a complete solution was obtained. The solution was then heated to 70°–80° C. and 5% NH$_4$Cl was added, followed by concentrated HCl to adjust the pH to 1.0. The precipitated dye was collected by filtration and washed with 1N HCl solution (500 ml) to give a paste.

The paste was stirred in water (500 ml) and concentrated ammonium hydroxide added to raise the pH to 9–9.5 to give a solution which was dialysed to remove chloride ions and solvent evaporated to give the title compound of Formula (3) in the form of it's ammonium salt. When made into an ink and printed onto acid, neutral or alkaline paper using a thermal ink jet printing machine, the printed image has a very high resistance to water with deep black shade.

The title compound was found to have good solubility in water, at 25° C. and pH 9.5, of about 8%, a lambda max at 558 nm and an E max of about 24,500.

Examples of specific inks containing the title compound of Formula (3) are:

| Ink | Compound (parts) | Liquid medium and other components (parts) |
|---|---|---|
| 1 | 2.5 | Water (60) Ethylene glycol (40) |
| 2 | 4.0 | Water (85) Diethylene glycol (15) |
| 3 | 5.0 | Water (90) N-methylpyrrolidone (10) |
| 4 | 3.0 | Water (65) Glycerol (25) Triethanolamine (10) |
| 5 | 2.0 | Water (80) Ethylene glycol (15) Polyethylene glycol (MW 200) (5) |
| 6 | 2.5 | Water (80) Diethylene glycol (20) |
| 7 | 3.0 | Water (92.5) Diethylene glycol (7.5) |

EXAMPLE 2

Preparation of the Compound of Formula (4)

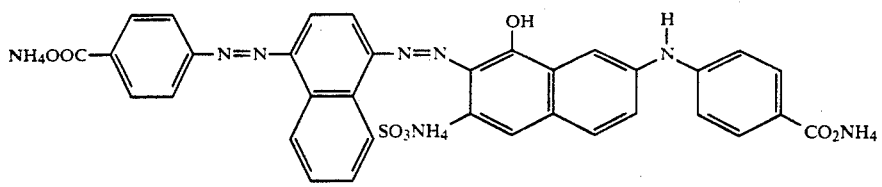

Formula (4)

The method of Example 1, stages 1, 2, 3 and 4, was followed except that in place of the 13.7 g of 3-aminobenzoic acid used in stage 1 there was used 13.7 g of 4-aminobenzoic acid.

Inks were prepared by dissolving 3 parts of the title compound in a mixture of water (92.5 parts) and diethylene glycol (7.5 parts) (Ink 8) and 2.5 parts of title compound in water (80 parts) and diethylene glycol (20 parts) (Ink 9).

When printed onto acid, neutral or alkaline paper Ink 8 and Ink 9 showed high water fastness.

The title dye was found to have a solubility in water at 25° C. of about 8%, an E max of about 22,000 and a lambda max at 567 nm.

EXAMPLE 3

Preparation of the Compound of Formula (5)

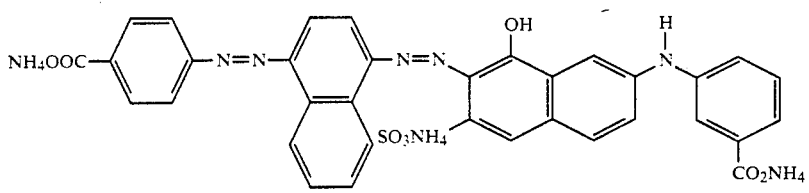

Formula (5)

The method of Example 1, stages 1, 2, 3 and 4, was followed except that in place of the 13.7 g of 3-aminobenzoic acid used in stage 1 there was used 13.7 g of 4-aminobenzoic acid, and in stage 3 there was used 3-carboxyphenyl gamma acid (35.9 g, 0.1m) in place of 4-carboxyphenyl gamma acid to give the title compound. When 3 parts of the title compound was made into an ink by dissolving in a mixture of water (92.5 parts) and diethylene glycol (7.5 parts) and printed onto plain paper using a thermal ink jet printing machine the title compound gave a printed image having very high water fastness and an attractive deep black shade.

The title compound was found to have a solubility in water of about 8%, an E max of about 23,500 and a lambda max at 553 nm.

EXAMPLE 4

Preparation of the Compound of Formula (6)

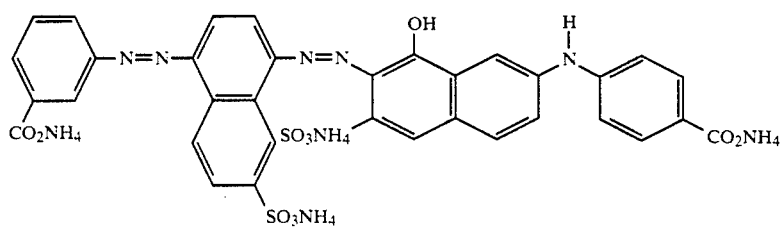

Formula (6)

The method of Example 1, stages 1, 2, 3 and 4, was followed except that in place of the 14.3 g of 1-naphthylamine used in stage 1 there was used 22.3 g 1-naphthylamine-7-sulphonic acid. When 3 parts of the title compound was made into an ink by dissolving in a mixture of water (92.5 parts) and diethylene glycol (7.5 parts) and printed onto plain paper using a thermal ink jet printing machine gave a printed image having very high water fastness and a deep neutral black shade showing no bronzing.

The title compound was found to have a solubility in water, at 25° C. and PH 8.5, of 13-15%, an E max of about 24,000, and a lambda max at 588 nm.

EXAMPLE 5

Preparation of the Compound of Formula (7)

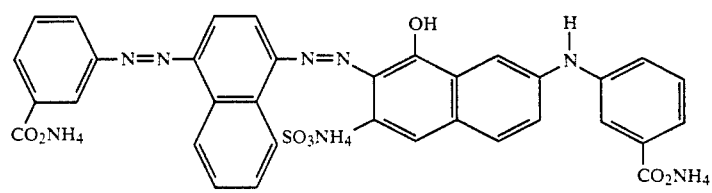

Formula (7)

The method of Example 1, stages 1, 2, 3 and 4, was followed except that in place of the 35.9 g of 4-carboxyphenyl gamma acid used in stage 3 there was used 35.9 g of 3-carboxyphenyl gamma acid.

EXAMPLE 6

Preparation of the Compound of Formula (8)

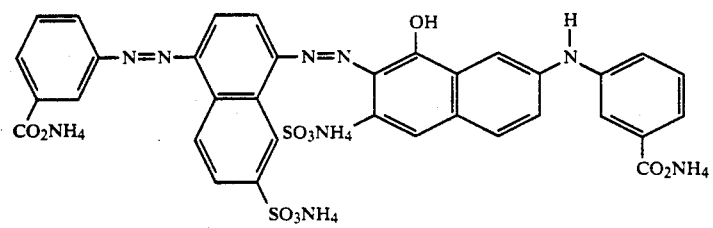

Formula (8)

The method of Example 1, stages 1, 2, 3 and 4, was followed except that in place of the 14.3 g of 1-naphthylamine used in stage 1 there was used 22.3 g 1-naphthylamine-7-sulphonic acid, and in place of the 35.9 g of 4-carboxyphenyl gamma acid used in stage 3 there was used 35.9 g of 3-carboxyphenyl gamma acid.

The title compound (3 parts) was made into an ink by dissolving in a mixture of water (92.5 parts) and diethylene glycol (7.5 parts) and printed onto plain paper using a thermal ink jet printing machine to give a printed image having very high water fastness and an attractive deep black shade.

The title dye was found to have a solubility in water of about 10%, an E max of about 15,000 and a lambda max at 578 nm.

EXAMPLE 7

Preparation of the Compound of Formula (9)

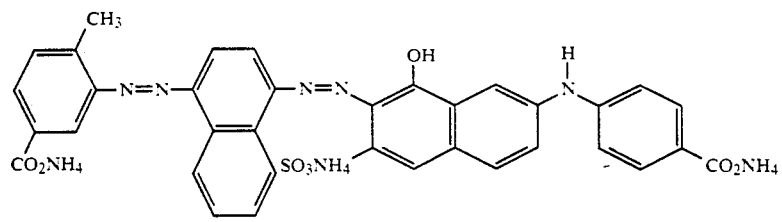

Formula (9)

The method of Example 1, stages 1, 2, 3 and 4, was followed except that in place of the 13.7 g of 3-aminobenzoic acid used in stage 1 there was used 15.1 g of 3-amino-4-methylbenzoic acid.

The title compound was made into an ink and printed on to plain paper using a thermal ink jet printing machine to give a printed image having very high water fastness and a deep black shade.

EXAMPLE 8

Preparation of

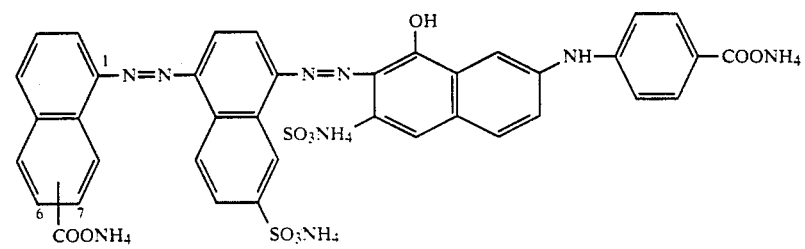

STAGE 1

A 1 to 1 (by weight) mixture of 6-carboxy-1-naphthylamine and 7-carboxy-1-naphthylamine (18.7g 0.1M) was stirred in water (200 ml) at room temperature and 2N NAOH added to form a solution at pH 8.0. 2N NaNO₂ solution (50 ml) was added and the mixture stirred to homogenise. The solution was added gradually to a mixture of ice/water (150 ml) and 35% HCl (50 ml) at 5° C. and the resulting solution stirred for 2 hours at 5° C. Sulphamic acid solution (10%) was added to destroy excess nitrous acid to give a first diazo suspension.

1,7-Cleves acid (22.3 g, 01.M) was dissolved in water (150 ml) and 47% NAOH solution to form a solution at pH 8.5. The solution was cooled to 5° C. To this solution was added the first diazo suspension and the pH adjusted to 4-5 by the addition of sodium acetate. The mixture was stirred for 18 hours and the dye collected by filtration and washed with little brine solution to give a paste.

STAGE 2

4-Carboxyphenyl Gamma acid was prepared as in Example 1, Stage 2.

Stage 3

The paste from Stage 1 (0.1M) was dissolved in water (1 liter) with addition of 2N NAOH solution, pH 10. 2N NANO₂ solution (50 ml) was added and the mixture stirred for 3 minutes, then added gradually to a mixture of ice/water (150 ml) and 36% HCl (50 ml) at 5° C. using rapid agitation. The resulting suspension was stirred for 2 hours at 5° C. Sulphamic acid (10%) was added in order to remove excess nitrous acid and give a second diazo suspension.

4-Carboxyphenyl Gamma acid (from Stage 2, 35.9 g, 0.1M) was dissolved in water (500 ml) with addition of 2N NAOH solution, pH 9.0. The solution was cooled to 0°–10° C. and added to the second diazo suspension, maintaining the pH at 8.0 with 2N NAOH solution.

The precipitated product was collected by filtration and washed with 5% NaCl solution (100 ml) to give a paste.

STAGE 4

The paste from Stage 3 was stirred in water (500 ml) at pH 8.0 until a complete solution was obtained. The solution was then heated to 70°–80° C. and 5% $NH_4Cl$ was added, followed by concentrated HCl to adjust the pH to 1.0. The precipitated dye was collected by filtration and washed with 1N HCl solution (500 ml) to give a paste.

The paste was stirred in water (500 ml) and concentrated ammonium hydroxide added to raise the pH to 9–9.5 to give a solution which was dialysed to remove chloride ions and solvent evaporated to give the title compound in the form of it's ammonium salt. When made into an ink and printed onto plain paper using a thermal ink jet printing machine, the printed image has a very high resistance to water with deep black shade.

The title dye was found to have good solubility in water.

Examples of specific inks including the title dye are:

| Ink | Dye Content (parts) | Liquid medium and other components (parts) |
|---|---|---|
| 1 | 2.5 | Water (90) Pyrrolidone (10) Ammonium phosphate (0.2) |
| 2 | 4.0 | Water (85) |
| 3 | 1.8 | Diethylene glycol (15) Dimethyl phosphate (0.3) Monomethyl phosphate (0.2) Water (90) |
| 4 | 3.0 | Diethylene glycol (10) Sodium borate (0.2) Water (65) Glycerol (25) Triethanolamine (10) |

EXAMPLE 9

Preparation of the Compound of Formula (10)

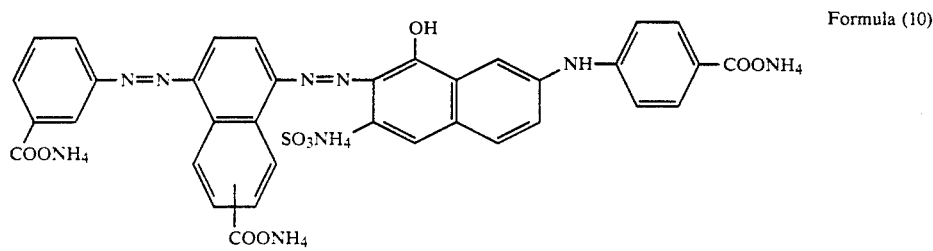

Formula (10)

The method of Example 1, stages 1, 2, 3 and 4, was followed except that in place of the 14.3 g of 1-naphthylamine used in stage 1 there was used 18.7 g of an approximately 50/50 mixture of 5-amino-2-naphthoic acid and 8-amino-2-naphthoic acid.

The title compound when made into an ink and printed onto plain paper using a thermal ink jet printing machine gave a printed image having very high water fastness and a deep black shade.

The title compound was found to have a solubility in water at 25° C. of about 8%, an E max of about 27,000 and a lambda max at 577 nm.

EXAMPLE 10

Preparation of the Compound of Formula (11)

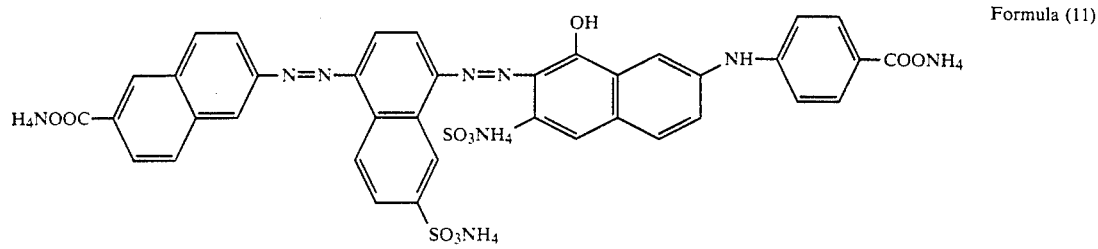

Formula (11)

The method of Example 1, stages 1, 2, 3 and 4 can be followed except that in place of 13.7 g of 3-aminobenzoic acid used in stage 1 there is used 18.7 g of 6-carboxy-2-aminonaphthalene and in place of 14.3 g 1-Naphthylamine there is used 22.3 g 1-7 Cleves acid.

EXAMPLE 11

Preparation of the Compound of Formula (12)

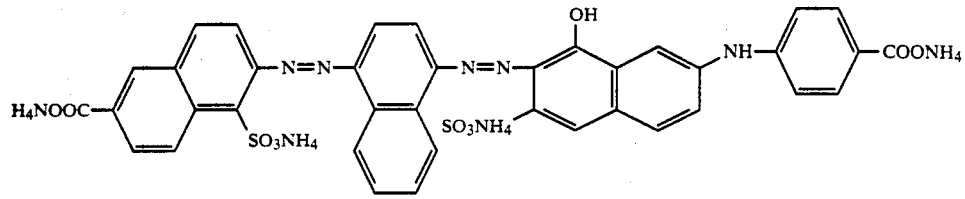

Formula (12)

The method of Example 1, stages 1, 2, 3 and 4 can be followed except that in place of the 13.7 g of 3-aminobenzoic acid used in stage 3 there is used 26.7 g 1-sulpho-6-carboxy-2-amino-naphthalene.

EXAMPLE 12

Preparation of the Compound of Formula (13)

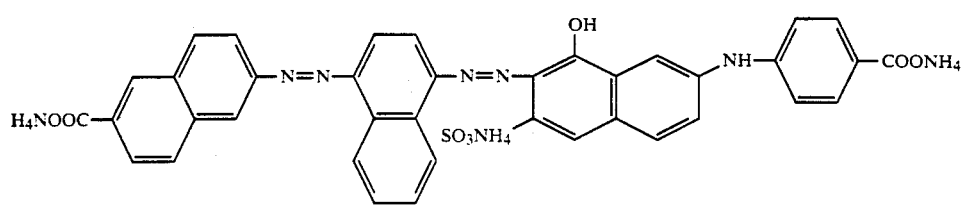

Formula (13)

The method of Example 1, stages 1, 2, 3 and 4 can be followed except that in place of 13.7 g of 3-aminobenzoic acid used in stage 1 there is used 18.7 g of 6-carboxy-2-aminonaphthalene.

EXAMPLE 13

Preparation of the Compound of Formula (3), Dimethyl Ammonium Salt

The method of Example 1 may be followed except that in stage 4 there is used dimethylamine solution in place of ammonium hydroxide.

EXAMPLE 14

Preparation of the Compound of Formula (3), Methyl Ammonium Salt

The method of Example 1 may be followed except that in stage 4 there is used methylamine solution in place of ammonium hydroxide.

EXAMPLE 15

An ink may be prepared comprising 10% 2-pyrrolidone, 0.2% sodium borate as pH buffer, 2% of the title compound of Example 1, 0.1% $NH_4H_2PO_4$ and the balance deionised water. The pH may be adjusted to 8.5 using $NH_4OH$ and the ink printed onto plain paper using a thermal ink jet printer.

EXAMPLE 16

An ink may be prepared according to Example 15 except that in place of the compound from Example 1 there is used 1% of the title compound from Example 6, and in place of $NH_4H_2PO_4$ there is used 0.5% of a 1:1 mixture of dimethylphosphate and monomethylphosphate. The ink may be printed onto plain paper using a thermal ink jet printer.

EXAMPLE 17

An ink may be prepared as described in Example 15 except that in place of 10% 2-pyrrolidone there may be used 12% N-methylpyrrolidone.

We claim:

1. A compound which, in the free acid form, is of the Formula (1):

Formula (1)

$$A-N=N-\text{[naphthyl]}-N=N-\text{[naphthyl with OH, HO}_3\text{S, T, Z]}-N(R^1)-\text{[phenyl with V, CO}_2\text{H]}$$

wherein

A is an optionally substituted phenyl or naphthyl group wherein the substituent is selected from the group consisting of $-CO_2H$; $-SO_3H$; $-C_{1-4}$-alkyl; $-C_{1-4}$-alkoxy; halo; $-CN$; $-NO_2$; $CO_2R^2$; $-SO_2R^2$; $-SO_2NR^2R^3$; $-NHCOCH_3$; and $-CONR^2R^3$; wherein $R^2$ are $R^3$ are each independently selected from H and $C_{1-4}$-alkyl.

Z is H, $CO_2H$, $SO_3H$ or $SO_2NH_2$;

T is H or $SO_3H$;

$R^1$ is H or optionally substituted alkyl;

V is H, $CO_2H$, $SO_3H$, $CH_3$ or Cl;

provided that the compound of Formula (1) has at least as many $CO_2H$ groups as $SO_3H$ groups.

2. A compound according to claim 1 wherein $R^1$ is H.

3. A compound according to claim 1 wherein Z is $SO_3H$ at the 7-position indicated in Formula (1).

4. A compound according to claim 1 wherein A is meta- or para-carboxyphenyl or 3,4- or 3,5-dicarboxyphenyl; $R^1$ and T are H; Z is H or $SO_3H$; and V is H or $CO_2H$.

5. A compound which, in the free acid form, is of the Formula:

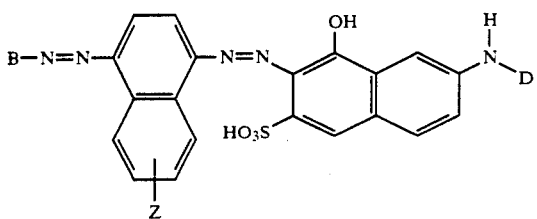

wherein:

Z is H or SO₃H; and

B and D are each independently 3-carboxyphenyl, 4-carboxyphenyl, 3,4-dicarboxyphenyl or 3,5-dicarboxyphenyl.

6. A composition comprising two or more compounds according to claim 1.

7. A composition according to claim 6 which contains two different compounds according to claim 1 wherein the identity and position of Z, T and $R^1$ is identical in both compounds but the identities and/or position of A and V are different.

8. An ink comprising a compound according to claim 1 and a liquid medium.

9. In a process for printing a substrate with an ink using an ink jet printer, which comprises forming the ink into small droplets by ejection from a reservoir through a small orifice so that the droplets of ink are directed at a substrate, the improvement wherein the ink used contains at least one compound according to claim 1.

10. Paper printed with a compound according to claim 1.

11. An ink comprising a composition according to claim 6 and a liquid medium.

12. An ink according to claim 8 wherein the liquid medium comprises a mixture of water and water-soluble organic solvent in a weight ratio of from 90:10 to 60:40.

13. A compound according to claim 1 wherein A carries a —CO₂H group and optionally a second group selected from CO₂H, SO₃H, methyl, methoxy and chloro.

14. A compound according to claim 1 wherein A is selected from 4-carboxyphenyl, 3-carboxyphenyl, 3,5-dicarboxyphenyl, 3,4-dicarboxyphenyl, 2-methyl-5carboxyphenyl, 2-sulpho-5-carboxyphenyl, 6-carboxynapth-1-yl, 7-carboxynaphth-1-yl, 6-carboxynaphth-2-yl and 1-sulpho-6-carboxy-naphth-2-yl.

* * * * *